(12) United States Patent
Sugiyama (10) Patent No.: US 11,657,242 B2
(45) Date of Patent: May 23, 2023

(54) INFORMATION CODE READING SYSTEM, INFORMATION CODE READER, AND INFORMATION CODE

(71) Applicant: DENSO WAVE INCORPORATED, Aichi-pref. (JP)

(72) Inventor: Wataru Sugiyama, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/216,225

(22) Filed: Mar. 29, 2021

(65) Prior Publication Data
US 2021/0303810 A1 Sep. 30, 2021

(30) Foreign Application Priority Data

Mar. 31, 2020 (JP) .............................. JP2020-063119

(51) Int. Cl.
*G06K 7/14* (2006.01)

(52) U.S. Cl.
CPC ......... *G06K 7/1417* (2013.01); *G06K 7/1413* (2013.01)

(58) Field of Classification Search
CPC ............... G06K 7/1417; G06K 7/1413; G06K 19/06009; G06K 7/1095; G06K 7/1408
See application file for complete search history.

(56) References Cited

U.S. PATENT DOCUMENTS

| 4,924,078 A | 5/1990 | Sant'Anselmo et al. |
| 2008/0035730 A1 | 2/2008 | Look |
| 2018/0137397 A1 | 5/2018 | Lau et al. |
| 2020/0042849 A1 | 2/2020 | Howard et al. |

FOREIGN PATENT DOCUMENTS

| FR | 3054699 A3 | 2/2018 |
| JP | 2014-071799 A | 4/2014 |
| JP | 2017-199423 A | 11/2017 |
| WO | 96/30217 A1 | 10/1996 |

OTHER PUBLICATIONS

Y. Kato, D. Deguchi, T. Takahashi, I. Ide and H. Murase, "Low Resolution QR-Code Recognition by Applying Super-Resolution Using the Property of QR-Codes," 2011 International Conference on Document Analysis and Recognition, 2011, pp. 992-996, doi: 10.1109/ICDAR.2011.201. (Year: 2011).*

* cited by examiner

*Primary Examiner* — Matthew Mikels
(74) *Attorney, Agent, or Firm* — Oliff PLC (57) ABSTRACT

There is provided an information code in which first cells have lightness that is intermediate between lightness of second cells and lightness of a predetermined marginal area. The first cells and the second cells are configured to have a difference in lightness therebetween sufficiently smaller than a difference in lightness between the first cells and the predetermined marginal area, in a predetermined area occupying at least a part of the code area. There is also provided an information code reader in which colors of an image of the information code captured by an imaging unit are corrected such that the difference in lightness between the first and second cells increases. Using the corrected image, decoding processing is performed to decode the information code.

15 Claims, 12 Drawing Sheets

INFORMATION CODE READING SYSTEM, INFORMATION CODE READER, AND INFORMATION CODE

CROSS-REFERENCE TO RELATED APPLICATION

This application is based on and claims the benefit of priority from earlier Japanese Patent Application No. 2020-06319 filed Mar. 31, 2020, the description of which is incorporated herein by reference.

BACKGROUND

Technical Field

The present disclosure relates to information code reading systems, information code readers, and information codes.

Related Art

Recently, information codes, such as barcodes or QR codes (registered trademark), are used in various applications, while the purposes of use of these codes are being diversified. For example, information codes may be used for payments. As a technique for using information codes for payments, there has been known a payment system as described in a patent document JP 2014-071799 A. In this payment system, money information of payment and user information are inputted to a mobile communication terminal by the user when making a payment at a store, etc. Then, the inputted information is transmitted to a management server. The management server produces meal coupon information as a QR code according to the received money information and transmits the QR code to the mobile communication terminal. Then, the mobile communication terminal displaying the meal coupon received as a QR code from the management server is presented by the user at the store. The presented meal coupon is read by the terminal at the store and the meal coupon information is transmitted to the management server to charge the price. In this way, payments can be smoothly made at stores, etc.

However, if the received information code is simply displayed on a display as in the payment system disclosed in JP 2014-071799 A, there may be a risk that an image of the displayed information code is captured by other devices. Specifically, there may be a risk that an image of the information code displayed on the mobile terminal may be fraudulently captured and duplicated by other devices.

If this occurs, the duplicated information code may be used for fraudulent processing, e.g., fraudulent payment processing, depending on the conditions where the image has been captured.

In this regard, there is known an information code reading system as disclosed, for example, in a patent document JP 2017-199423 which takes measures against such fraudulence. In this information code reading system, the information code has a light module area serving as an inverted area and a dark module area serving as a non-inverted area. Specifically, the light module area using an infrared reactive ink serves as an inverted area where dark color reflection characteristics are exerted when visible light is applied thereto and, when infrared light is applied thereto, dark color is inverted to light color, while the dark module area using an ordinary ink serves as a non-inverted area where ordinary dark color reflection characteristics are exerted. Accordingly, in a normal environment where visible light is applied, not only the dark module area but also the light module area are perceived as a dark color. Furthermore, when making a copy of this information code using a copying machine or the like, the entire information code is printed as a dark color, disabling reading of the information code. In an information code reader of this system, an image of the information code is captured in a state where infrared light is applied thereto, so that the dark module area is detected as a dark color area and the light module area is detected as a light color area. Thus, the information code can be decoded based on the results of the detection.

Systems as described above, in which an information code is produced using an infrared reactive ink, need dedicated printers, and therefore, the unit price of the display media becomes higher, raising an issue that it is difficult to reduce cost as systems. In addition, the need to use an infrared reactive ink raises an issue, for example, that the above technique cannot be applied to the information codes which are displayed on screens.

SUMMARY

With consideration of the foregoing drawbacks, especially, the fraudulent processing, it is thus desired to provide a configuration that can prevent information codes from being duplicated due to fraudulent imaging.

To achieve the above issue, an aspect of the present disclosure is an information code reading system which includes a display medium and an information code reader.

The display medium displays an information code in which a plurality of first cells, and a plurality of second cells, which have lightness (or lightness levels, lightness values) different from that of the first cells, are arrayed in a code area defined by a predetermined marginal area. The information code reader optically reads the information code.

In the information code of this system, the first cells have lightness that is intermediate between lightness of the second cells and lightness of the predetermined marginal area. Specifically, the first cells and the second cells are configured to have a difference in lightness therebetween sufficiently smaller than a difference in lightness between the first cells and the predetermined marginal area, in a predetermined area occupying at least a part of the code area.

The information code reader includes an imaging unit, an image correction unit and a decoding unit. The imaging unit captures an image of the information code. The image correction unit corrects colors of an image captured by the imaging unit to increase a difference in lightness between the first cells and the second sells in the predetermined area. The decoding unit performs decoding processing to decode the information code using the image corrected by the image correction unit.

In this aspect, the limitation of "sufficiently smaller" means that the first cell is determined to a lightness level showing a color which can be perceived to be substantially the same as the color of the second cell by the autoexposure control function of an ordinary camera (a known existing camera) to the present display technique is not applied.

A second aspect of the present disclosure is an information code reader that optically reads an information code in which a plurality of first cells, and a plurality of second cells, which have lightness different from that of the first cells, are arrayed in a code area defined by a predetermined marginal area.

In the information code, the first cells have lightness that is intermediate between lightness of the second cells and lightness of the predetermined marginal area. Specifically, the first cells and the second cells are configured to have a difference in lightness therebetween sufficiently smaller than a difference in lightness between the first cells and the predetermined marginal area, in a predetermined area occupying at least a part of the code area.

The information code reader includes an imaging unit, an image correction unit, and a decoding unit. The imaging unit captures an image of the information code. The image correction unit corrects colors of an image captured by the imaging unit to increase a difference in lightness between the first cells and the second sells in the predetermined area. The decoding unit performs decoding processing to decode the information code using the image corrected by the image correction unit.

A third aspect of the present disclosure is an information code in which a plurality of first cells, and a plurality of second cells, which have lightness different from that of the first cells, are arrayed in a code area defined by a predetermined marginal area.

In the information code, the first cells have lightness that is intermediate between lightness of the second cells and lightness of the predetermined marginal area. Specifically, the first cells and the second cells are configured to have a difference in lightness therebetween sufficiently smaller than a difference in lightness between the first cells and the predetermined marginal area, in a predetermined area occupying at least a part of the code area.

It should be noted that the bracketed reference signs show correspondency to the specific means in the embodiments described later.

According to the first aspect, the first cells in the information code have lightness that is intermediate between lightness of the second cells therein and lightness of the predetermined marginal area. Specifically, the first cells and the second cells are configured to have a difference in lightness therebetween sufficiently smaller than a difference in lightness between the first cells and the predetermined marginal area, in a predetermined area occupying at least a part of the code area. In the information code reader, colors of the image of the information code captured by the imaging unit are corrected by the image correction unit such that the difference in lightness becomes greater between the first and second sells in the predetermined area. For this corrected image, the decoding unit performs decoding processing for decoding the information code.

Thus, if an image of the information code is captured by an ordinary camera which has not the reading function provided by the present disclosure, the autoexposure control function of the camera works such that, in the predetermined area, the colors of the first and second cells become clearly different from the color of the predetermined marginal area, and that the color of the first cells becomes the same as that of the second cells. In other words, an attempt to fraudulently capture an image of the information code using an ordinary camera may result in imparting a single color to the predetermined area, disabling readably capturing an image of the information code. This can prevent duplication of the information code due to fraudulent imaging. If an image of the information code is captured using the information code reader of the present disclosure, the image is corrected such that the difference in lightness becomes greater between the first and second cells in the predetermined area. Thus, by decoding this corrected image, the above information code can be decoded.

According to the first aspect, the predetermined area is set so as to align with the code area. Thus, since the entire code area is likely to be perceived as a single color, the presence of the information code can be concealed.

According to the first aspect, the predetermined area is set excepting areas of position detection patterns used for detecting the code area. Thus, the user operating the information code reader can identify the position of the code area based on the position detection patters that can be easily visually recognized. Therefore, the information code reader can be easily oriented to the information code.

According to the first aspect, the display medium displaying an information code is a display device capable of displaying the information code on a screen. Thus, even if the information code is displayed on a screen, duplication of the information code by fraudulent imaging can be prevented.

According to the first aspect, the predetermined marginal area is configured to have a white color, the second cells are configured to have a black color, and the first cells in the predetermined area are configured to have a color close to black. Thus, if an ordinary camera is used, the predetermined marginal area is imaged with a white color, while the predetermined area is imaged with a solid black color. This can prevent duplication of the information code by fraudulent imaging.

According to the first aspect, the predetermined marginal area is configured to have a black color, the second cells are configured to have a white color, and the first cells in the predetermined area are configured to have a color close to white. Thus, if an ordinary camera is used, the predetermined marginal area is imaged with a black color, while the predetermined area is imaged with a solid white color. This can prevent duplication of the information code by fraudulent imaging.

According to the second aspect, an information code reader exerting advantageous effects similar to those exerted in the first aspect can be achieved.

According to the third aspect, the first cells have lightness that is intermediate between lightness of the second cells and lightness of the predetermined marginal area. Specifically, the first cells and the second cells are configured to have a difference in lightness therebetween sufficiently smaller than a difference in lightness between the first cells and the predetermined marginal area, in a predetermined area occupying at least a part of the code area.

Thus, if an image of the information code of the present disclosure is captured using an ordinary camera, the autoexposure control function of the camera works such that, in the predetermined area, the colors of the first and second cells become clearly different from the color of the predetermined marginal area and that the first and second cells are imaged as having the same color. In other words, an attempt to fraudulently capture an image of the information code using an ordinary camera may result in imparting a single color to the predetermined area, disabling readably capturing an image of the information code. This can prevent duplication of the information code due to fraudulent imaging. Furthermore, the information code reader performs decoding processing for a corrected image that has been corrected such that colors of an imaged information code will have a greater difference in lightness between the first and second cells in the predetermined area. Using this information code reader, the information code can be decoded.

DETAILED DESCRIPTION OF THE PREFERRED EMBODIMENTS

First Embodiment

Referring to the drawings, a first embodiment of an information code reading system, an information code reader, and an information code according to the present disclosure will be described.

The present embodiment provides an information code reading system 10 which is a system for preventing duplication of a fraudulently captured image of an information code. The information code reading system 10 includes a mobile terminal 20 and an information code reader 30. The mobile terminal 20 serves as a display medium on which an information code requiring duplication prevention (which may also be simply termed an information code C hereinafter) is displayed. The information code reader 30 optically reads the information code C displayed on the mobile terminal 20.

Figure 1:
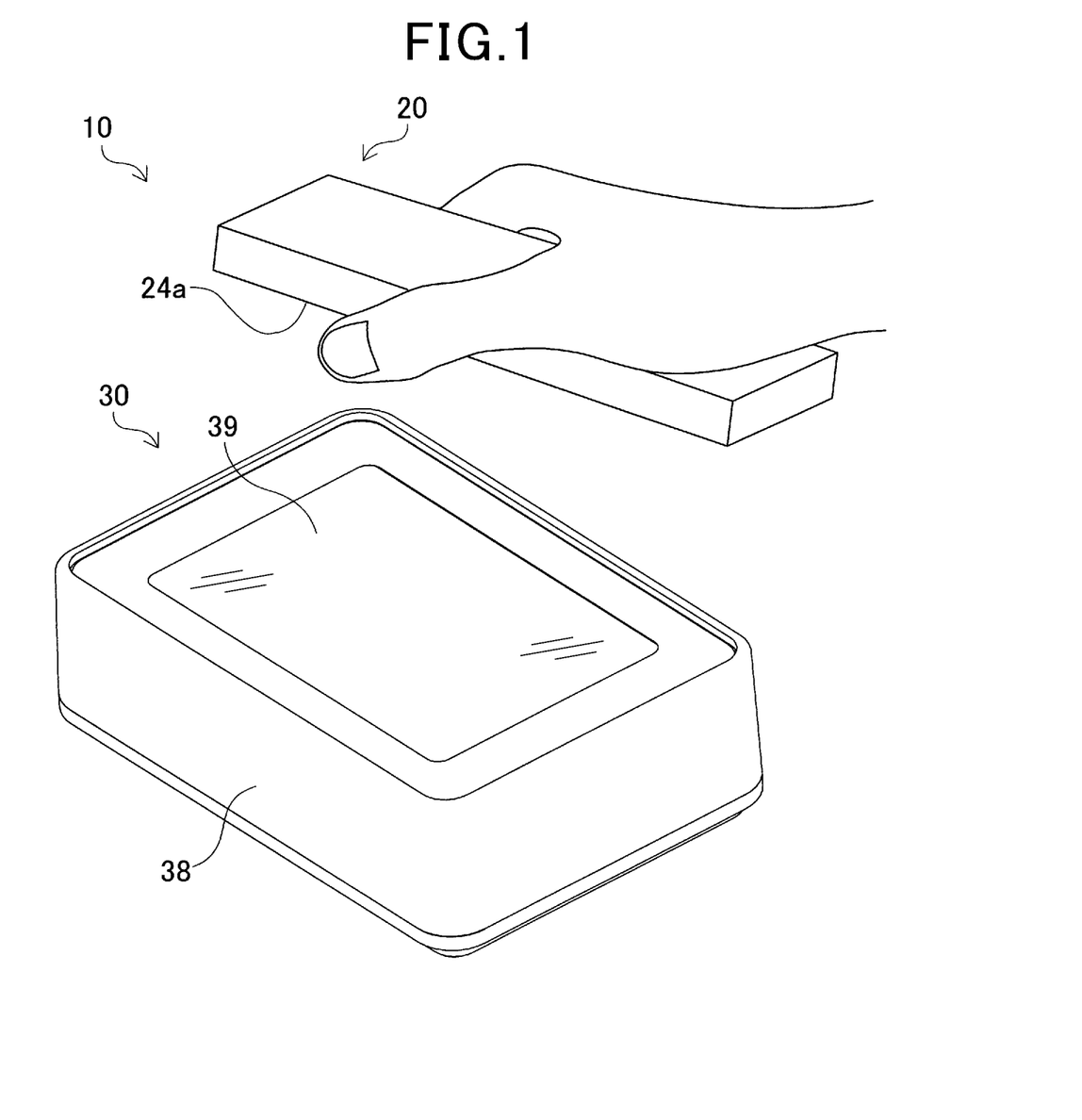
FIG. 1 is a schematic diagram illustrating an information code reading system according to a first embodiment of the present disclosure.
Figure 2:
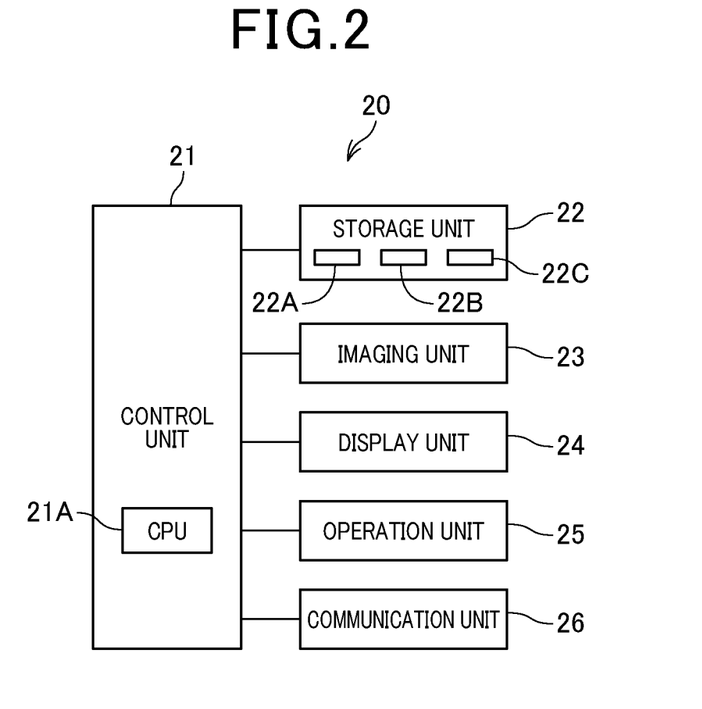
FIG. 2 is a schematic block diagram illustrating an electrical configuration of the mobile terminal shown in FIG. 1.

Referring to FIGS. 1 and 2, the mobile terminal 20 will be described first.

The mobile terminal 20 according to the present embodiment is configured with an application program (which may also be termed an information code display application hereinafter) installed. For example, the application program produces and displays an information code C on a mobile information processing terminal, such as a smartphone, carried by the user. As shown in FIG. 2, the mobile terminal 20 includes a control unit 21, a storage unit 22, an imaging unit 23, a display unit 24, an operation unit 25, and a communication unit 26. The control unit 21 includes a CPU 21A. The storage unit 22 includes a ROM 22A, a RAM 22B, and a nonvolatile memory 22C. In this example, the ROM 22A functions as a non-transitory computer readable storage medium in which a desired computer program including a program for a code reading and display procedures according to the present example is pre-stored. The computer program enables the CPU 21A to perform necessary programs so that the control unit 31 serves as various calculation and control means. The imaging unit 23 is configured as a camera including a light-receiving sensor (e.g., C-MOS area sensor, CCD area sensor, etc.). The display unit 24 is a touch panel type display. The operation unit 25 includes various operation keys, and touch panel (not shown). The communication unit 26 is configured as a communication interface enabling wireless or wired communication with external units.

In the mobile terminal 20 configured in this way, the above information code display application is started when displaying an information code C read by the information code reader 30 on a screen 24a of the display unit 24, so that the control unit 21 can start information code display processing. In the information code display processing, a QR code or the like in which confidential information, such as personal information and payment information, to be read by the information code reader 30 is recorded is produced and displayed on the screen 24a as an information code C. In this information code C displayed, the cell color of the QR code or the like has been partially changed so that an image thereof cannot be readably captured using an ordinary camera.

Figure 3:
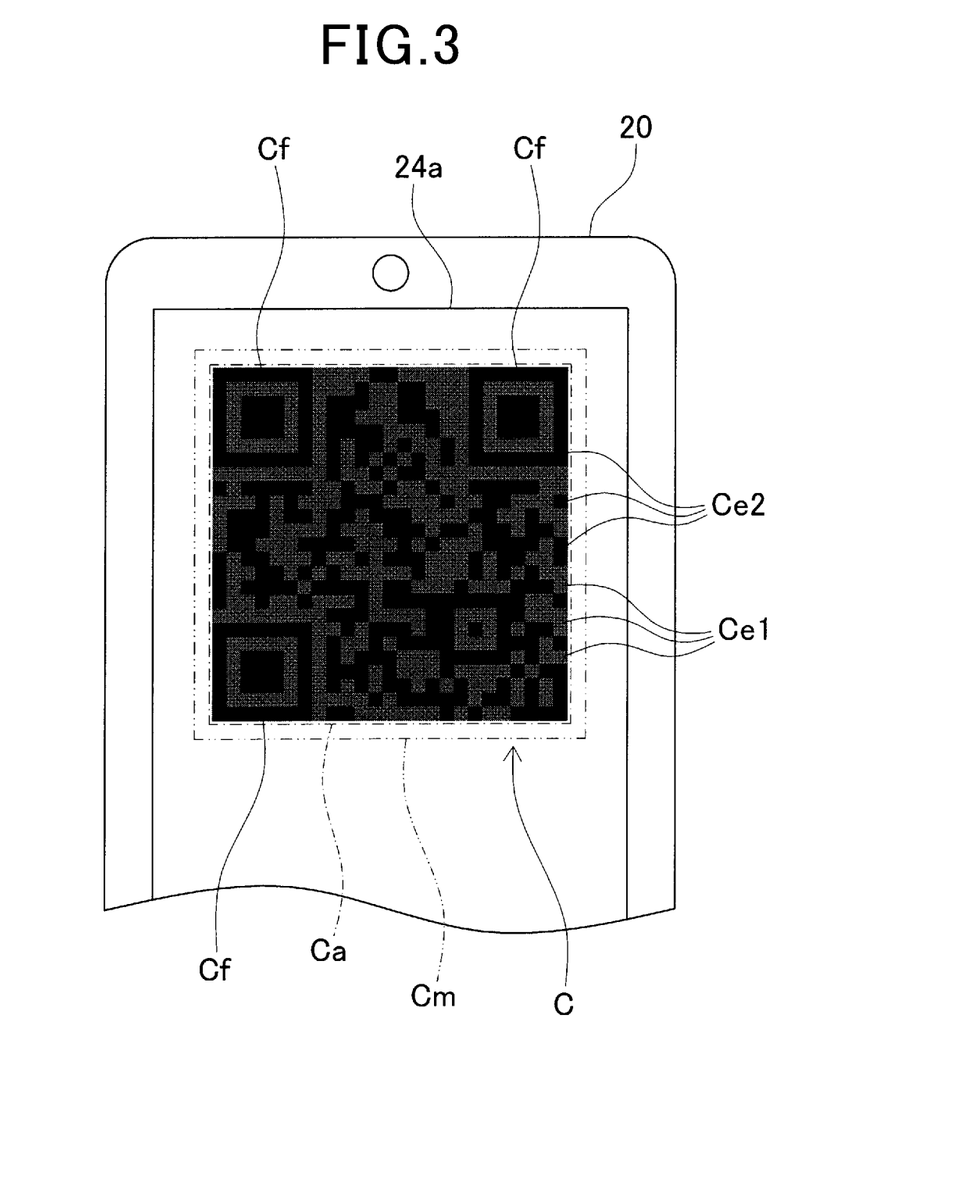
FIG. 3 is a diagram illustrating an information cord according to the first embodiment.

Referring to FIG. 3, the information code C displayed on the mobile terminal 20 will be described in detail.

As shown in FIG. 3, the information code C displayed on the screen 24a of the mobile terminal 20 is a QR code (registered trademark) which is presented in a code area Ca defined by a square marginal area having a predetermined width (which may also be termed a marginal area Cm hereinafter). In the code area Ca, the QR code is configured by arraying a plurality of two types of cells (first cells Ce1 and second cells Ce2) with different levels of lightness. Three corners of the code area Ca are provided with respective position detection patterns Cf formed of the first and second cells Ce1 and Ce2, used for detecting the code area Ca.

In the present embodiment, the lightness of the first cells Ce1 is intermediate between the lightness of the second cells Ce2 and that of the marginal area Cm. Specifically, it is so configured that, in the entire code area Ca, the difference D1 (not shown) in lightness between the first cells Ce1 and the second cells Ce2 becomes smaller than the difference D2 (not show) in lightness between the first cells Ce1 and the marginal area Cm. In particular, when compared with the difference D2, it is desired that the difference D1 is set to be sufficiently smaller than the difference D2 (i.e., D1<<<D2).

More specifically, the marginal area Cm is white (e.g., level 255 in a 256-level gray scale), the second cells Ce2 are black (e.g., level 0 in a 256-level gray scale), and the first cells Ce1 are dark gray close to black (e.g., level 10 in a 256-level gray scale). It should be noted that the color of the first cells Ce1 does not have to be necessarily configured so as to have level 10 (slightly gray) in a 256-level gray scale. For example, the color of the first cells Ce1 may be configured so as to have a level in the range of 10 to 50 in a 256-level gray scale, at which level the color can be perceived to be substantially the same as the color of the second cells Ce2 by the autoexposure control function of an ordinary camera (an existing camera) with no display function according to the present embodiment. When the first cell Ce1 is given such a gray scale selected from a gray scale range of 10 to 50, it can be defined that, in the present embodiment, the difference D1 is sufficiently smaller than the difference D2. In FIG. 3, the first and second cells Ce1 and Ce2 are shown with colors easily distinguished therebetween, for convenience of explanation.

In this way, in the present embodiment, the second cells Ce2 serve as dark color cells, while the first cells serve as light color cells. Accordingly, the first cells Ce1 can be detected as light color cells from an image of the information code C, while the second cells can be detected as dark color cells. With this detection, the confidential information recorded on the information code C can be decoded.

Figure 4:
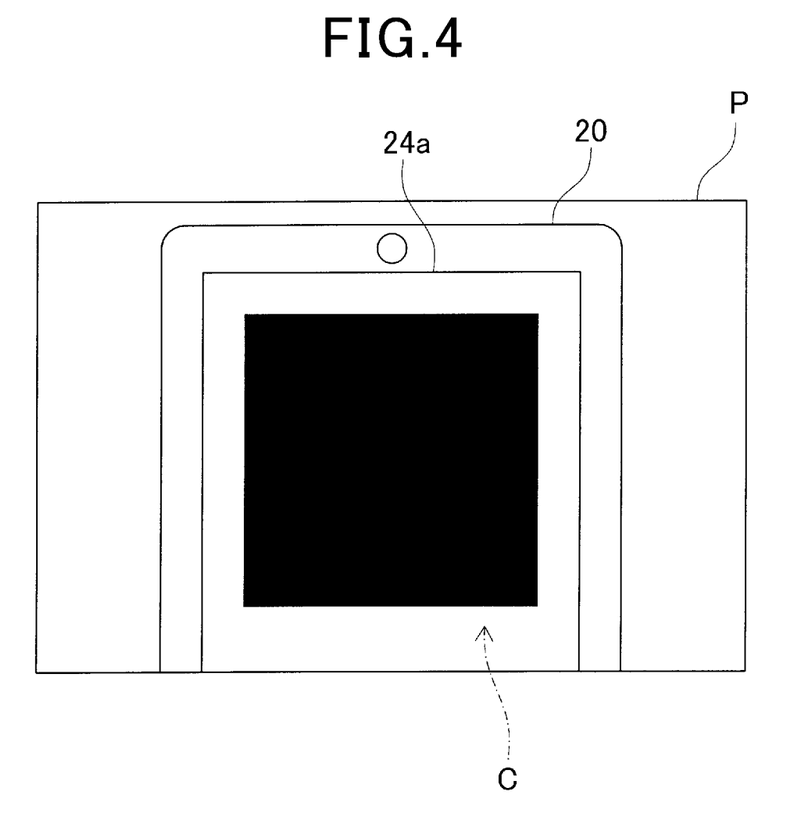
FIG. 4 is a diagram illustrating an image of the information code shown in FIG. 3 captured by an ordinary camera.

If an image of the information code C shown in FIG. 3 is captured by an ordinary camera, the code area Ca is imaged as solid black as in an image P shown in FIG. 4, due to the autoexposure control function of the camera.

In the following, the reasons why an image of the code area Ca is captured as solid black by ordinary cameras will be described.

Figure 5:
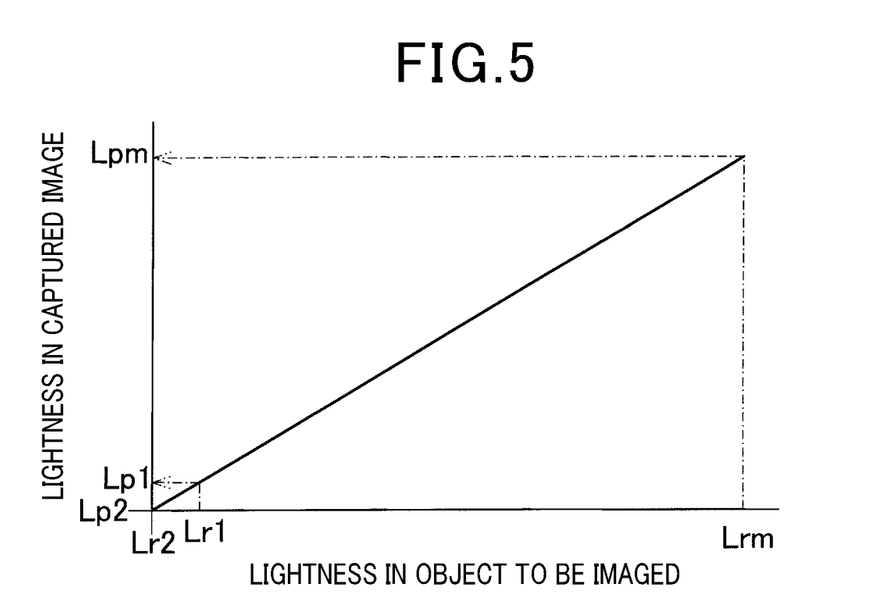
FIG. 5 is a diagram illustrating a relationship between lightness range of an object to be imaged and lightness range of a captured image in the case where an image of the information code shown in FIG. 3 is captured by an ordinary camera.

With the autoexposure control functions of ordinary cameras, the marginal area Cm with a white color (lightness Lrm) and the second cells Ce2 with a black color (lightness Lr2) are in the imaging field of view. Therefore, as shown in FIG. 5, the lightness range of the object to be imaged increases. Accordingly, the lightness range in the captured image used for decoding also increases due to the lightness Lpm of the marginal area Cm and the lightness Lp2 of the second cells Ce2. Also, since the difference between the lightness Lr1 of the first cells Ce1 and the lightness Lr2 of the second cells Ce2 is small, the lightness of the area occupied by the first cells Ce1 in the captured image is substantially the same as the lightness Lp2 in the area occupied by the cells Ce2.

Therefore, the first and second cells Ce1 and Ce2 are imaged as having colors clearly different from the color of the marginal area Cm, while the first and second cells Ce1 and Ce2 are imaged as having the same black color. In other words, an attempt to capture an image of the information code C using an ordinary camera may result in obtaining an image of the code area Ca as solid black, disabling readably capturing an image of the information code C.

Figure 6:
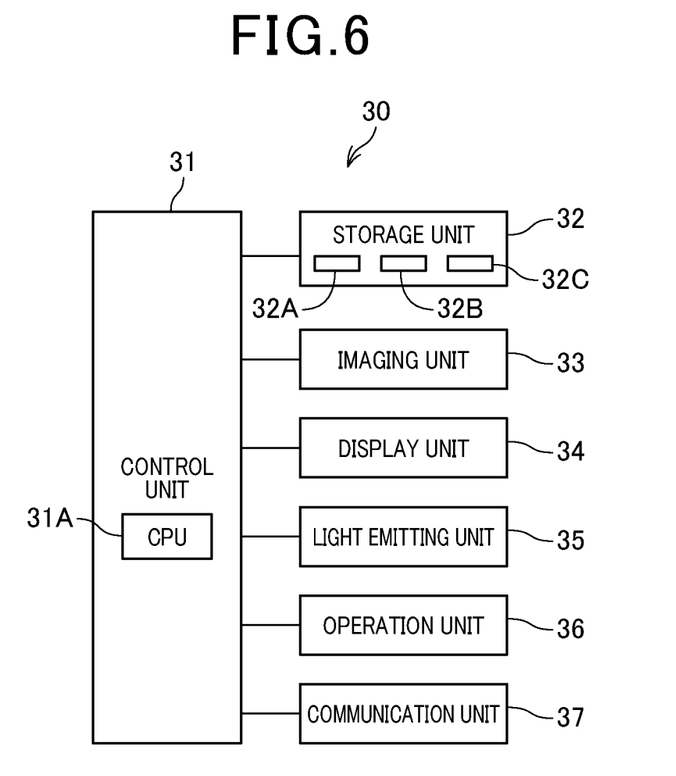
FIG. 6 is a schematic block diagram illustrating an electrical configuration of the information code reader shown in FIG. 1.

Referring to FIGS. 1 and 6, the information code reader 30 for optically reading the information code C configured as described above will be described in detail.

The information code reader 30 according to the present embodiment is a device for optically reading an information code, such as a QR code, or text information and is set up in stores or other places which provide predetermined services using the results of reading information codes. As shown in FIG. 6, the information code reader 30 includes a control unit 31 including a CPU 31A, a storage unit 32 including a ROM 32A, a RAM 32B, and a nonvolatile memory 32C, an imaging unit 33, a display unit 34 including a liquid crystal display, a light emitting unit 35 including a LED, an operation unit 36 including various keys (not shown), and a communication unit 37 configured as a communication interface for performing wired or wireless communication with external units, such as high-order terminals. In this example, the ROM 32A functions as a non-transitory computer readable storage medium in which a desired computer program including a program for a code reading and displaying procedures according to the present example is pre-stored. The computer program enables the CPU 31A to perform necessary programs so that the control unit 31 serves as various calculation and control means.

The imaging unit 33 is configured as a camera including an area sensor in which solid-state image sensing devices, such as C-MOSs and CCDs, are two-dimensionally arrayed. While being controlled by the control unit 31, the imaging unit 33 acquires image data by converting an optical image of an object to be imaged, such as an information code, displayed on the screen, into electrical signals (image signals).

As shown in FIG. 1, the information code reader 30 includes a casing 38 configuring a contour thereof. The casing 38 has an upper surface which is provided with a substantially rectangular reading window 39 over which an information code or the like is held for optical reading. The imaging unit 33 is held inside the casing 38 to receive light reflected from the information code or the like held over the reading window 39 and capture an image of the code.

The storage unit 32 of the information code reader 30 configured as described above stores an application program related to reading processing for reading the information code C of the present disclosure, so that the program can be executed by the control unit 31. When this application program is executed, processing is executed using the predetermined information recorded on the optically read information code C.

Referring to the flow diagram shown in FIG. 7, an example of the reading processing will be described. The reading processing is executed by the control unit 31 of the information code reader 30 configured as described above, when reading the information code C shown in FIG. 3.

Figure 7:
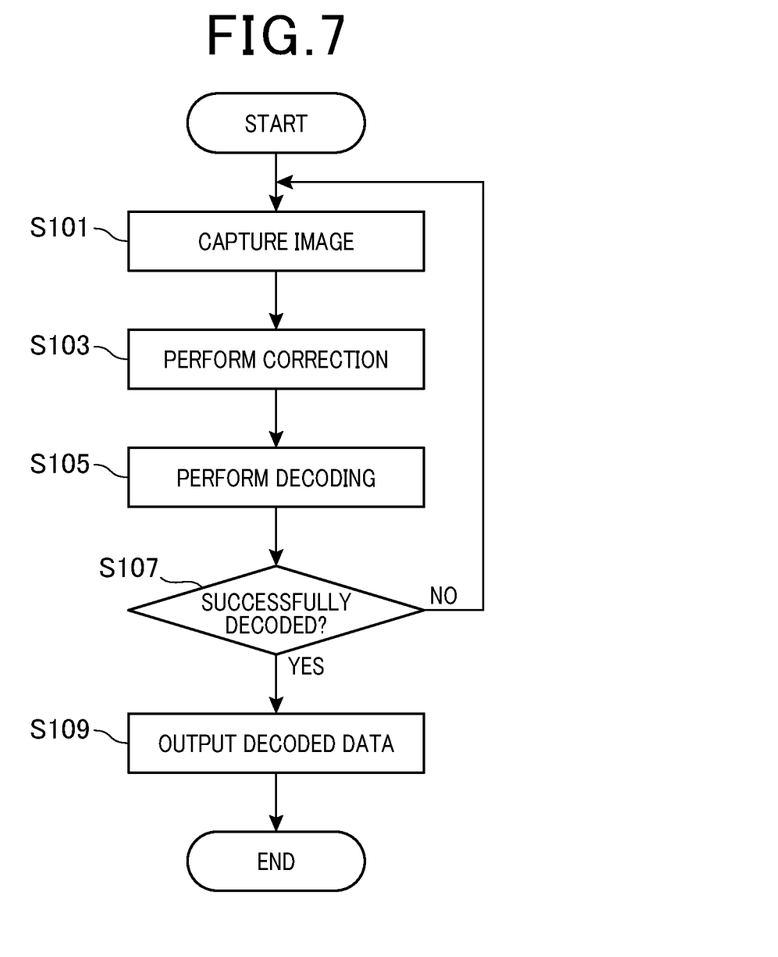
FIG. 7 is a flow diagram illustrating reading processing performed by a control unit of the information code reader.

When the reading processing is started by the control unit 31 in response to a predetermined operation for the operation unit 36, imaging processing shown in step S101 of FIG. 7 is started to bring the reader into a state in which the imaging unit 33 can read the information code C or the like.

Figure 8:
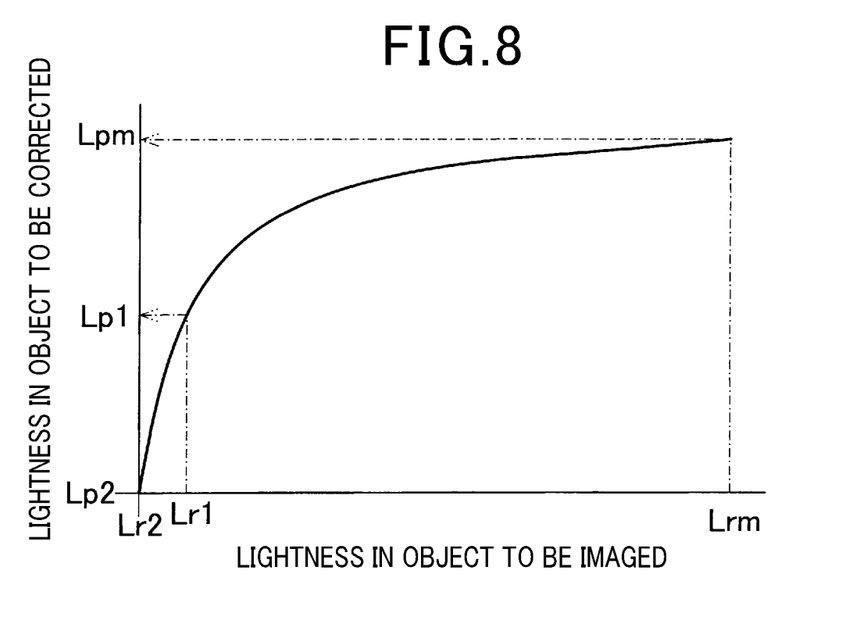
FIG. 8 is a diagram illustrating a relationship between lightness range of an object to be imaged and lightness range of a corrected image, according to the first embodiment.
Figure 9:
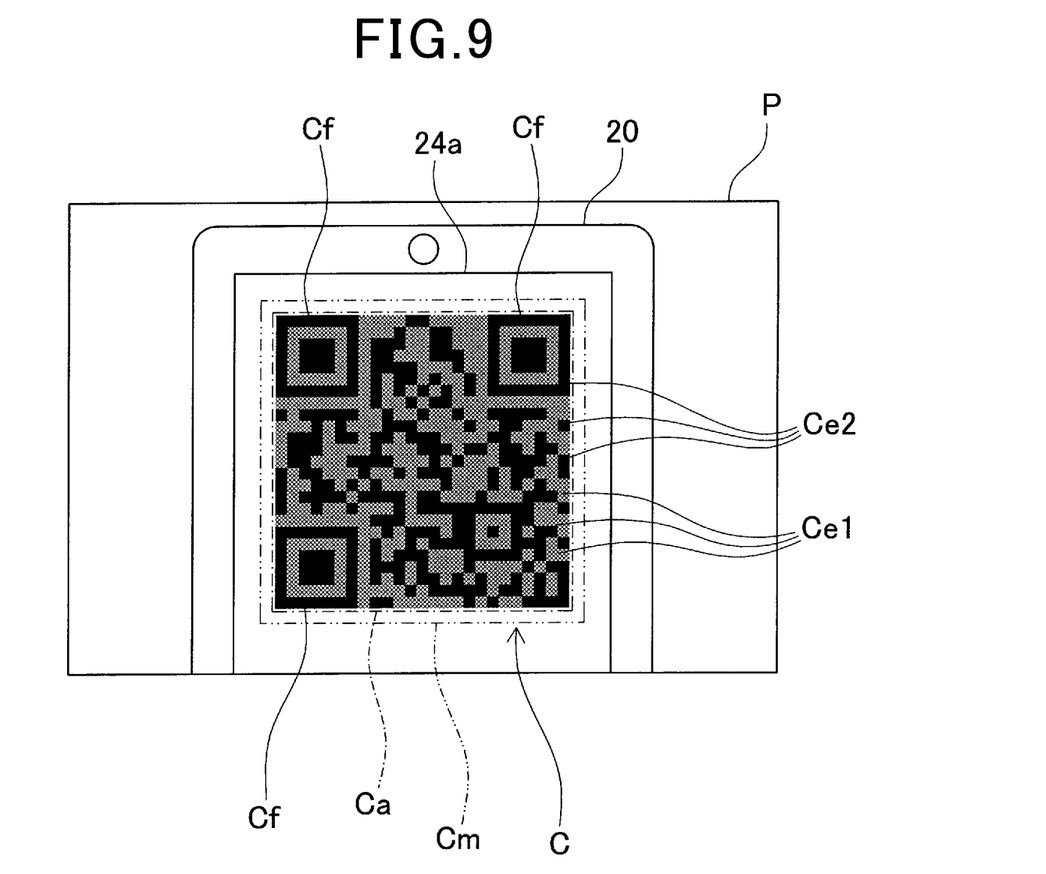
FIG. 9 is a diagram illustrating an image obtained by correcting an image of the information code shown in FIG. 3.

Next, image correction processing shown in step S103 is performed to correct colors of the image such that the difference in lightness between the first cells Ce1 and the second cells Ce2 increases. Specifically, in the present embodiment, as shown in FIG. 8, the image data derived from the imaging unit 33 is subjected to gamma correction to increase the difference between the lightness Lp1 and the lightness Lp2. Thus, as in a captured image P shown in FIG. 9, the dark gray color of the first cells Ce1 in the captured image is corrected to have higher lightness so as to be clearly distinguished from the black color of the second cells Ce2. It should be noted that the control unit 31 performing the image correction processing in step S103 can correspond to an example of the image correction unit.

After correcting the captured image as described above, control proceeds to step S105 to perform decoding processing. In the decoding processing, the corrected image is processed for decoding the information code C. After successfully completing the decoding processing (Yes in step S107), the results of the decoding are outputted to a high-order terminal via the communication unit 37 (step S109) and the reading processing is terminated. If the decoding processing ends in failure (No in step S107), control returns to step S101. It should be noted that the control unit 31 performing the decoding processing shown in step S105 can correspond to an example of the decoding unit.

As described above, in the information code reading system 10 of the present embodiment, the lightness Lr1 of the first cells Ce1 is intermediate between the lightness Lr2 of the second cells Ce2 and the lightness Lrm of the marginal area Cm in the information code C. Specifically, it is so configured that the difference D1 (not shown) between the lightness Lr1 of the first cells Ce1 and the lightness Lr2 of the second cells Ce2 becomes smaller, particularly, sufficiently smaller than the difference D2 (not shown) between the lightness Lr1 of the first cells Ce1 and the lightness Lm of the marginal area Cm. Furthermore, in the information code reader 30, colors of an image of the information code C captured by the imaging unit 33 are corrected, so that the difference between the lightness Lp1 of the first cells Cell and the lightness Lp2 of the second cells Ce2 increases, and then decoding processing for decoding the information code C is performed for the corrected image.

Thus, if an image of the information code C is captured using an ordinary camera which has no code reading function according to the present embodiment, the first and second cells Ce1 and Ce2 are imaged as having colors clearly different from the color of the marginal area Cm, while the first and second cells Ce1 and Ce2 are imaged as having the same black color, due to the autoexposure control function of the camera. Specifically an attempt to fraudulently capture an image of the information code C using an ordinary camera may result in obtaining an image of the code area Ca with a single color. Thus, since the information code C cannot be readably imaged, duplication of the information code C by fraudulent imaging can be prevented. In this regard, if an image of the information code C is captured using the information code reader 30, the difference between the lightness Lp1 of the first cells Ce1 and the lightness Lp2 of the second cells Ce2 is corrected so as to be greater. Accordingly, by performing decoding processing for the corrected image, the information code C can be decoded.

In particular, the display medium, on which the information code C is displayed, is the mobile terminal 20 that serves as a display device capable of presenting an image of the information code C on the screen. Therefore, even if the information code C is displayed on a screen, duplication of the information code C by fraudulent imaging can be prevented.

In the above, it is described that the information code C is configured such that all the first cells Ce1 serving as light cells in the code area Ca have lightness lower than that of the second cells Ce2 therein. However, the configuration is not limited to this. For example, only a part of the first cells Ce1 may have lightness lower than that of the second cells Ce2. Specifically, in the same manner as that already described, in the information code C, the difference between the lightness Lr1 of the first cells Ce1 and the lightness Lr2 of the second cells Ce2 may become sufficiently smaller than the difference between the lightness Lr1 of the first cells Ce1 and the lightness Lrm of the marginal area Cm, only in a predetermined area occupying at least a part of the code area Ca. If the information code C has an error correction function, the above predetermined area is set beyond the error correctable area.

Figure 10:
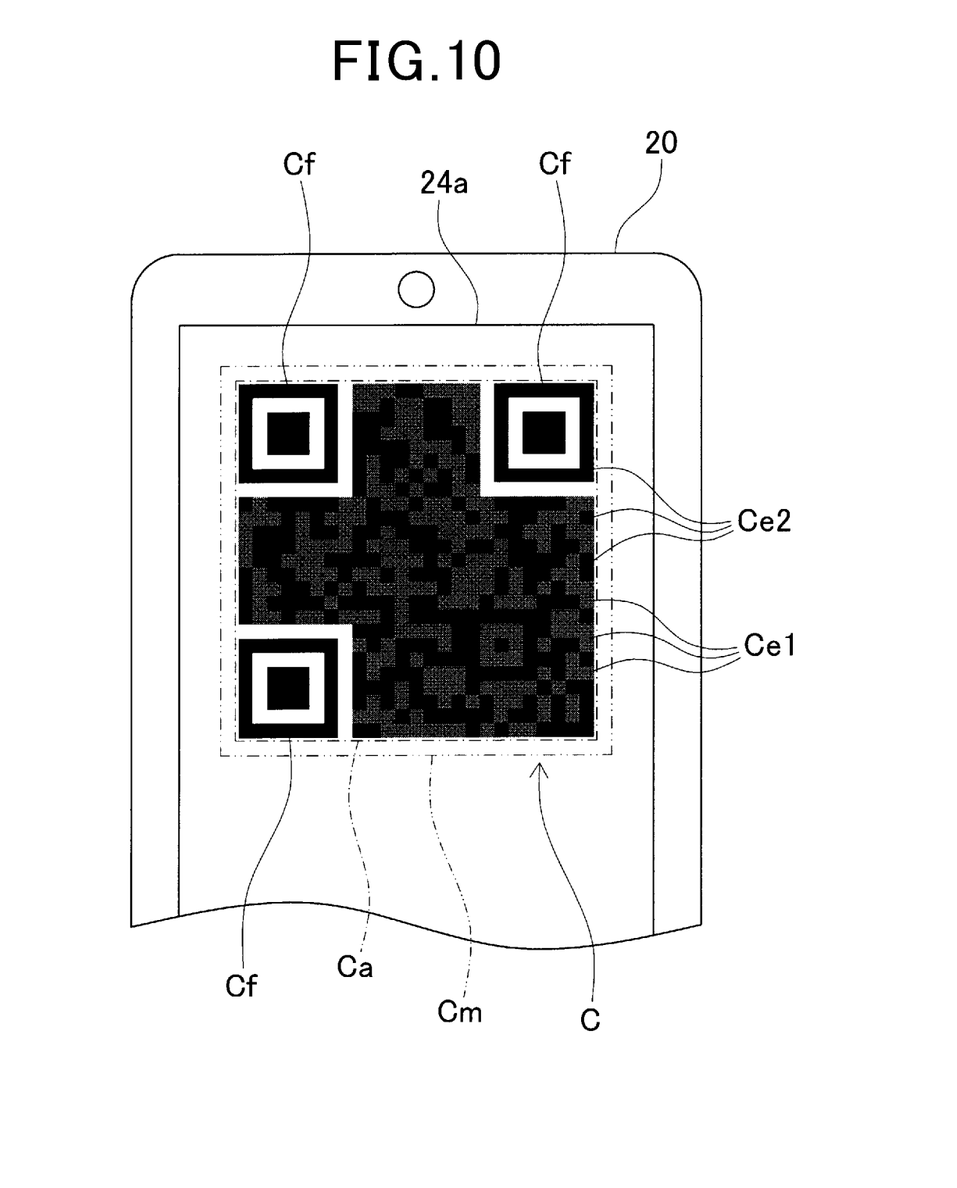
FIG. 10 is a diagram illustrating an information code according to a modification of the first embodiment.

For example, as in an information code C shown in FIG. 10 as a modification of the present embodiment, the predetermined area may be set excepting the areas of the position detection patterns Cf used for detecting the code area Ca. In such a configuration, the user operating the information code reader 30 can identify the position of the code area Ca with reference to the position detection patterns Cf that can be easily visually recognized. Accordingly, the information code reader 30 can be easily oriented to the information code C.

Furthermore, as shown in FIG. 3 referred to in the above, the entire code area Ca is likely to be perceived as a single color if the predetermined area is set being aligned with the code area Ca. Consequently, the presence of the information code C can be concealed.

Second Embodiment

Figure 11:
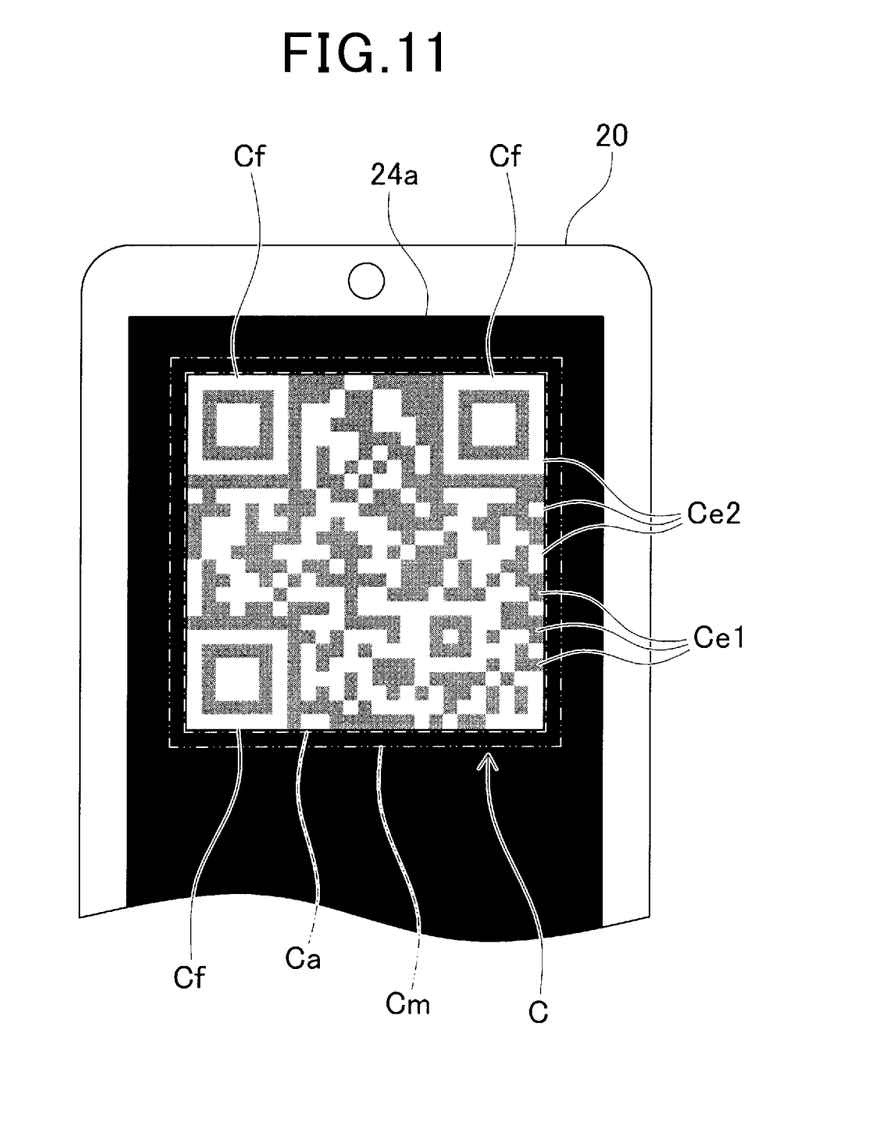
FIG. 11 is a diagram illustrating an information code according to a second embodiment of the present disclosure.
Figure 12:
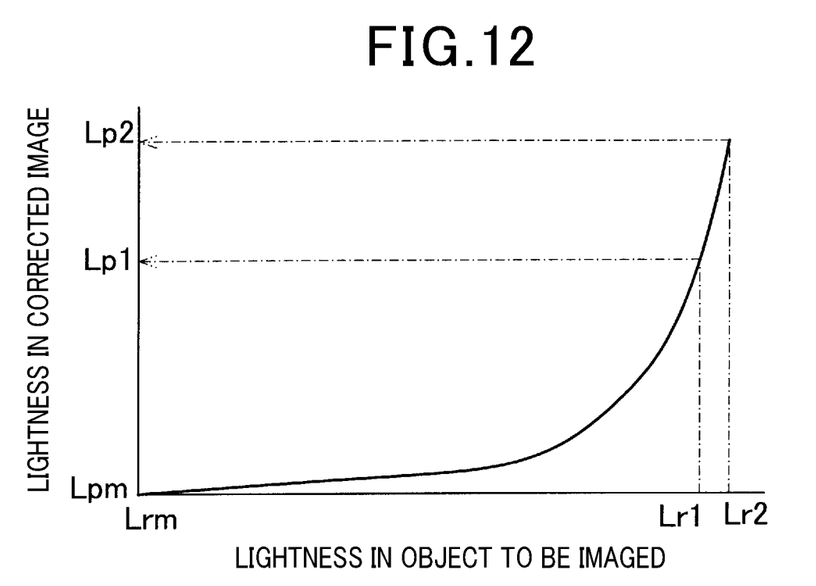
FIG. 12 is a diagram illustrating a relationship between lightness range of an object to be imaged and lightness range of a corrected image, according to the second embodiment.

Referring to FIGS. 11 and 12, an information code reading system, an information code reader, and an information code according to a second embodiment of the present disclosure will be described.

In the second embodiment, the components identical with or similar to those in the first embodiment are given the same reference numerals and signs for the sake of omitting unnecessary explanation.

As shown in FIG. 11, the second embodiment is mainly different from the first embodiment in that the marginal area Cm is black, the second cells Ce2 are white, and the first cells Ce1 are in a color close to white (e.g., level 245 in a 256-level gray scale). In FIG. 11, the first cells Ce1 are shown in a color easily distinguishable from the second cells Ce2, for convenience of explanation.

Therefore, in the image correction processing shown in the above step S103, the image data derived from the imaging unit 33 is gamma-corrected, as shown in FIG. 12, so that the difference between the lightness Lp1 and the lightness Lp2 increases. Thus, the color of the first cells Ce1 close to white in the captured image is corrected to be darker, enabling clear distinction from the white color of the second cells Ce2.

Accordingly, if an image of the information code C shown in FIG. 11 is captured by an ordinary camera, the lightness in the area occupied by the first cells Ce1 in the captured image may become substantially the same as the lightness in the area occupied by the second cells Ce2 in the captured image, because there is only a small difference between the lightness Lr1 of the first cells Ce1 and the lightness Lr2 of the cells Ce2. Thus, since the marginal area Cm is imaged in a black color while the code area Ca is imaged in a solid white color, duplication of the information code C by fraudulent imaging can be prevented. In this regard, as can be seen from FIG. 12, if an image of the information code C is captured using the information code reader 30, the lightness Lp1 of the first cells Ce1 and the lightness Lp2 of the second cells Ce2 are corrected so that the difference therebetween increases. Accordingly, by performing decoding processing for the corrected image, the information code C can be decoded.

As in the first embodiment, the information code C of the present embodiment may be configured such that the difference between the lightness Lr1 of the first cells Ce1 and the lightness Lr2 of the second cells Ce2 become sufficiently smaller than the difference between the lightness Lr1 of the first cells Ce1 and the lightness Lrm of the marginal area Cm, only in a predetermined area occupying at least a part of the code area Ca, in the same manner as that already described.

The present disclosure should not be construed as being limited to the embodiments and modifications described above, but may be embodied as follows.

(1) In the above description, the information code C of the present disclosure is displayed on the screen of a display device like the mobile terminal 20. However, the present disclosure is not limited to this. For example, the information code C may be displayed being printed on other display media, such as paper media.

(2) In the information code C according to the first embodiment, the marginal area Cm is configured to have a white color. However, the configuration is not limited to this. For example, the marginal area Cm may have a light color close to white. Furthermore, in the information code C according to the first embodiment, the second cells Ce2 are configured to have a black color. However, the configuration is not limited to this. For example, the second cells Ce2 may be configured to have a dark color close to black whose lightness is slightly lower than that of the first cells Ce1.

(3) In the information code C according to the second embodiment, the marginal area Cm is configured to have a black color. However, the configuration is not limited to this. For example, the marginal area Cm may be configured to have a dark color close to black. Furthermore, in the information code C according to the second embodiment, the second cells Ce2 are configured to have a white color. However, the configuration is not limited to this. For example, the second cells Ce2 may be configured to have a light color close to white whose lightness is slightly higher than that of the first cells Ce1.

(4) In the above description, the information code C of the present disclosure is configured as a QR code. However, the configuration is not limited to this. For example, the information code C may be configured as other types of codes, such as a barcode, data matrix code, or MaxiCode.

What is claimed is:

1. An information code reading system comprising:
   a display medium that displays an information code having a code area defined by a predetermined marginal area, a plurality of first cells and a plurality of second cells being arranged in the code area, lightness of the first cells being different from lightness of the second cells; and
   an information code reader that optically reads the information code, wherein
   the first cells have the lightness that is intermediate between the lightness of the second cells and lightness of the predetermined marginal area, and the first cells and the second cells are configured to have a difference in lightness sufficiently smaller than a difference in lightness between the first cells and the predetermined marginal area in a predetermined area occupying at least a part of the code area; and
   the information code reader comprises
      an imaging unit that captures an image of the information code,
      an image correction unit configured to apply a gamma correction to colors of the image captured by the imaging unit to increase a difference in lightness between the first cells and the second cells in the predetermined area, and
      a decoding unit configured to perform decoding processing to decode the information code based on the image gamma-corrected by the image correction unit.

2. The information code reading system according to claim 1, wherein the predetermined area is set so as to align with the code area.

3. The information code reading system according to claim 1, wherein:
   the information code is configured, with position detection patterns used for detecting the code area being disposed in the code area; and the predetermined area is set excepting areas of the position detection patterns.

4. The information code reading system according to claim 1, wherein the display medium is a display device capable of displaying an image of the information code on a screen.

5. The information code reading system according to claim 4, wherein the predetermined marginal area is configured to have a white color, the second cells are configured to have a black color, and the first cells in the predetermined area are configured to have a color close to black.

6. The information code reading system according to claim 4, wherein the predetermined marginal area is configured to have a black color, the second cells are configured to have a white color, and the first cells in the predetermined area are configured to have a color close to white.

7. The information code reading system according to claim 2, wherein the display medium is a display device capable of displaying an image of the information code on a screen.

8. The information code reading system according to claim 7, wherein the predetermined marginal area is configured to have a white color, the second cells are configured to have a black color, and the first cells in the predetermined area are configured to have a color close to black.

9. The information code reading system according to claim 8, wherein the predetermined marginal area is configured to have a black color, the second cells are configured to have a white color, and the first cells in the predetermined area are configured to have a color close to white.

10. The information code reading system according to claim 3, wherein the display medium is a display device capable of displaying an image of the information code on a screen.

11. The information code reading system according to claim 10, wherein the predetermined marginal area is configured to have a white color, the second cells are configured to have a black color, and the first cells in the predetermined area are configured to have a color close to black.

12. The information code reading system according to claim 11, wherein the predetermined marginal area is configured to have a black color, the second cells are configured to have a white color, and the first cells in the predetermined area are configured to have a color close to white.

13. The information code reading system according to claim 1, wherein the predetermined marginal area is configured to have a white color, the second cells are configured to have a black color, and the first cells in the predetermined area are configured to have a color close to black.

14. The information code reading system according to claim 1, wherein the predetermined marginal area is configured to have a black color, the second cells are configured to have a white color, and the first cells in the predetermined area are configured to have a color close to white.

15. An information code reader that optically reads an information code having a code area defined by a predetermined marginal area, a plurality of first cells and a plurality of second cells being arranged in the code area, lightness of the first cells being different from lightness of the second cells, wherein:
   the first cells have the lightness that is intermediate between the lightness of the second cells and lightness of the predetermined marginal area, and the first cells and the second cells are configured to have a difference in lightness sufficiently smaller than a difference in lightness between the first cells and the predetermined marginal area in a predetermined area occupying at least a part of the code area; and
   the information code reader comprises
      an imaging unit that captures an image of the information code,
      an image correction unit configured to apply a gamma correction to colors of the image captured by the imaging unit to increase a difference in lightness between the first cells and the second cells in the predetermined area, and a decoding unit configured to perform decoding processing to decode the information code based on the image gamma-corrected by the image correction unit.

\* \* \* \* \*